United States Patent [19]

Clavin

[11] 4,177,914
[45] Dec. 11, 1979

[54] ROTARY INTERNAL PIPE CLAMP APPARATUS

[75] Inventor: Edward A. Clavin, Houston, Tex.

[73] Assignee: Midcon Pipeline Equipment Co., Houston, Tex.

[21] Appl. No.: 875,289

[22] Filed: Feb. 6, 1978

[51] Int. Cl.² ............................................. B23K 37/04
[52] U.S. Cl. ................................... 228/49 B; 228/50; 269 48.1; 279/119
[58] Field of Search ............... 228/44.5, 49 B; 29/252; 228/50; 269/48.1; 279/2 R, 1.19

[56] References Cited

U.S. PATENT DOCUMENTS

| | | | |
|---|---|---|---|
| 2,737,141 | 3/1956 | Mitchell | 269/48.1 |
| 2,780,194 | 2/1957 | Croswell | 228/44.5 X |
| 3,145,997 | 8/1964 | Moses | 279/119 X |
| 3,644,977 | 2/1972 | Valentine | 29/252 |
| 3,741,457 | 6/1973 | Gwin et al. | 228/44.5 |
| 3,748,426 | 7/1973 | Stanley | 228/45 |

Primary Examiner—Francis S. Husar
Assistant Examiner—K. J. Ramsey
Attorney, Agent, or Firm—Carl B. Fox, Jr.

[57] ABSTRACT

Rotary internal pipe clamp apparatus for use in welding pipes together end to end, said apparatus having a first set of circularly spaced pipe engagement elements for disposition within the end of one section of pipe, and having a second set of circularly spaced pipe engagement elements for disposition in the end of a second length of pipe abutted end to end with the first length of pipe. Each set of circularly spaced pipe engagement elements is expanded and retracted by rotation of a circular disc to which said pipe engagment elements are linked by toggle elements. In addition, the apparatus includes a welding back up assembly which is expandable and retractable simultaneously with the second set of pipe engagement elements. The welding back up assembly includes plural peripheral bands or strips which are supplemented by shorter peripheral bands or strips which separately retract and expand.

35 Claims, 8 Drawing Figures

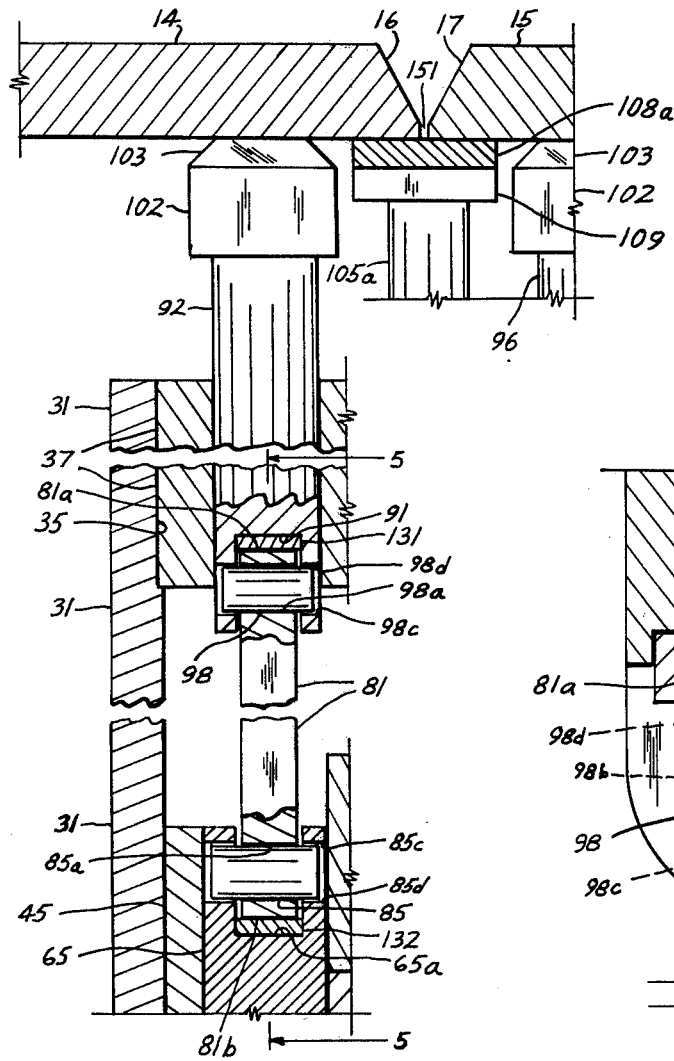
Fig. 5
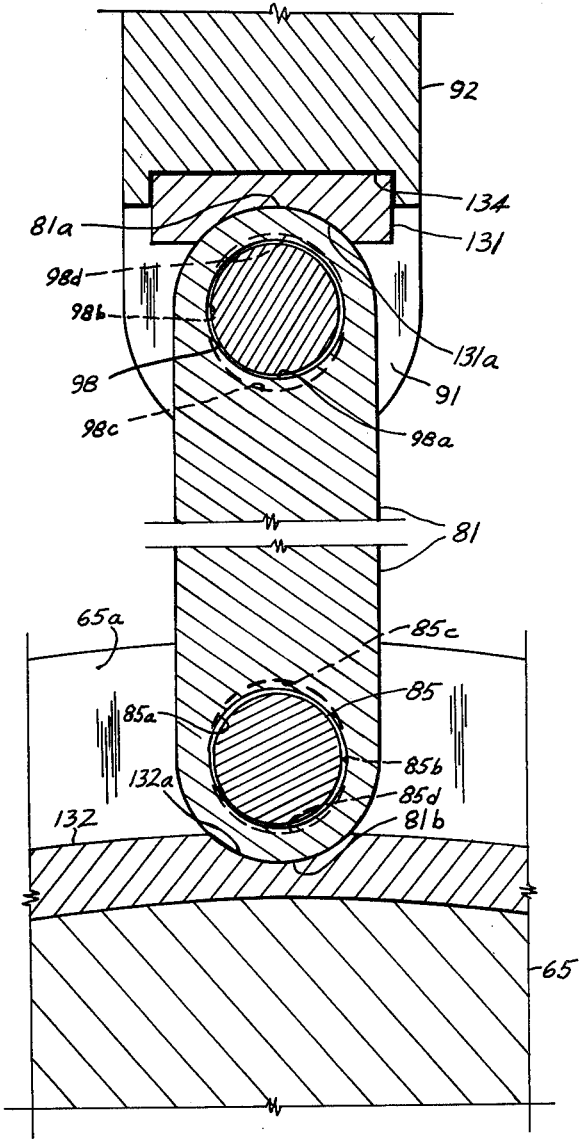
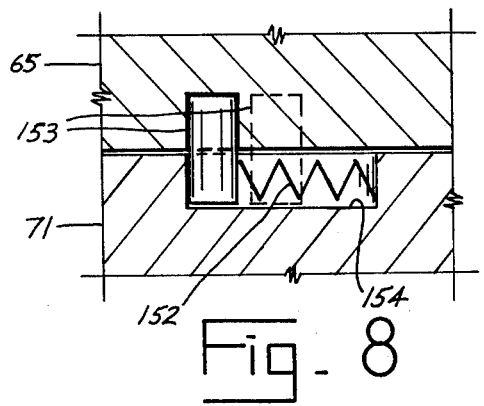
Fig. 4
Fig. 8

ROTARY INTERNAL PIPE CLAMP APPARATUS

BACKGROUND OF THE INVENTION

In welding lengths of pipe end to end, as in the welding together of lengths of pipe making up a pipe line, the abutting pipe ends must be matched as accurately as possible as to circularity and peripheral spacing. During welding, the pipes are not abutted together in contact, but a small uniform gap between the pipe ends is provided in order that welding may be accomplished through the entire wall thicknesses. In the case of relatively thick walled pipes, a great deal of force is required to urge the pipe ends to be as nearly as possible of circular form. Previous apparatuses known in the art have not been capable of creating forces of sufficiently large magnitude that the pipe ends may be made completely circular. In addition to the requirement for large forces at the clamps to make the pipe ends circular, it is also required of the pipe clamps that they be capable of holding the pipe ends accurately with the required small spacing or gap therebetween and so that the pipe ends do not become cocked one relative to the other during the welding operation. The pipe lengths are awkward to handle, being at least forty feet in length, and with the large wall thicknesses employed for the pressures now employed in pipelines, the weight of the pipe lengths is very great. Pipes are often welded into pipelines in multiple lengths; for example, the standard forty foot lengths of pipe may be welded together, or double jointed, to produce lengths of eighty feet, or may be triple jointed to produce lengths of one hundred and twenty feet. This is done so that the number of welds to be made in the field in assembling the pipeline may be reduced, the double jointing or triple jointing being done under controllable conditions where the pipe lengths may be more easily supported.

In welding pipe lengths together, it is necessary that a back up assembly be provided around the interiors of the pipe ends so that welding material will not be projected into the pipes, and so that the weld itself will not bulge into the pipe interior to form a discontinuity along the pipe wall. In order that good welds between the pipe ends may be achieved, the back up assembly must be continuous around the pipe periphery beneath the location of the weld, and must be firmly held in place against the interior pipe walls. The back up assembly must be positionable across the gap between the pipe ends after the pipes have been placed in position. Since the back up assembly must be retracted for movement to the location of the weld and must be expanded to provide adequate back up, previous apparatuses have almost invariably had peripheral gaps or irregularities whereby adequate back up for welds was not provided.

The present invention solves all or most of the above discussed problems.

SUMMARY OF THE INVENTION

The invention provides an efficient and reliable clamp apparatus for clamping pipe ends together for welding and also provides a welding back up assembly which is superior to those heretofore provided. The clamp apparatus and welding back up assembly operate together, so that the welding back up need not be provided by separate apparatus. Operation of the apparatus is simple and automatic, so that difficulties in use do not arise. The pipe clamps, one for each of the two abutted pipe ends, are expanded and retracted separately by central rotary equipment which drives radially movable pipe engagement elements inwardly and outwardly simultaneously through link or toggle connections to the central rotary equipment. The clamps are separately operable, so that one clamp may first be disposed in clamping disposition within one length of the pipe and then the other length of pipe may be brought up to the first and clamped by the other clamping assembly. The welding back up assembly is expanded into place automatically by operation of the second set of clamps, so that no separate operation to provide an adequate welding back up is required.

A principal object of the invention is to provide an improved internal pipe clamp and welding back up apparatus. Another object of the invention is to provide such an apparatus wherein the pipe clamps are separately operated and wherein the pipe clamps are actuated by rotary drive means. A further object of the invention is to provide such apparatus wherein the pipe engaging elements are expanded with high outward radial force whereby the pipe ends are adequately clamped to be made circular and to hold the pipe ends in proper relative positions, and to prevent cocking of the pipe ends one relative the other. A further object of the invention is to provide such apparatus which is simple in construction and operation, and which is not subject to difficulties and failure during operations. Yet another object of the invention is to provide such apparatus which is dependable, light in weight, efficient in use, and entirely adequate for its intended use.

Other objects and advantages of the invention will appear from the following detailed description of a preferred embodiment thereof, reference being made to the accompanying drawings.

BRIEF DESCRIPTION OF THE DRAWINGS

FIG. 4 is an enlarged partial axial cross section showing a portion of the apparatus shown in FIG. 1.

FIG. 5 is an enlarged cross section taken at line 5—5 of FIG. 4.

FIG. 8 is a cross section taken at line 8—8 of FIG. 2.

DESCRIPTION OF THE PREFERRED EMBODIMENT

Figure 1:
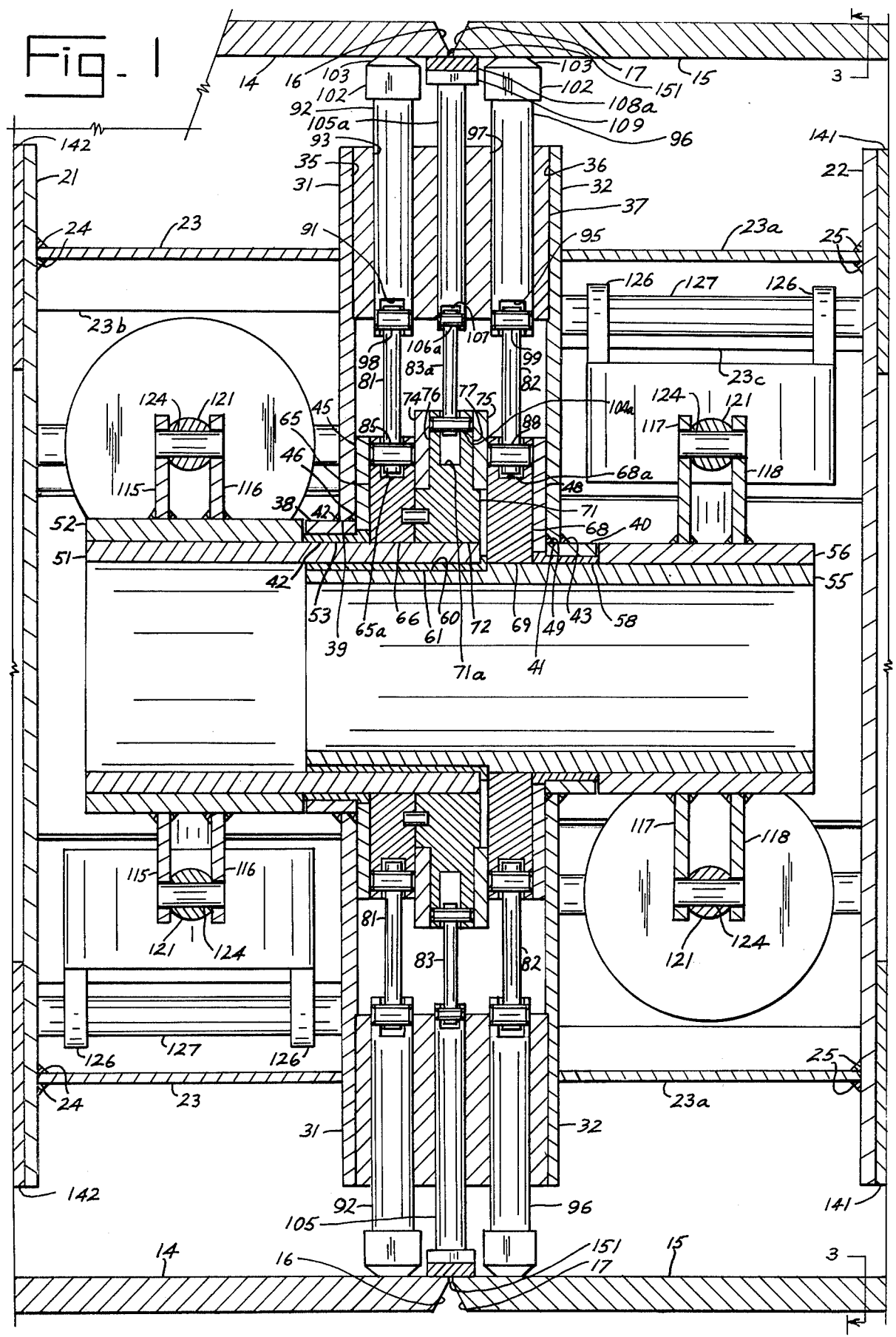
FIG. 1 is an axial cross section of a preferred embodiment of apparatus according to the invention.
Figure 3:
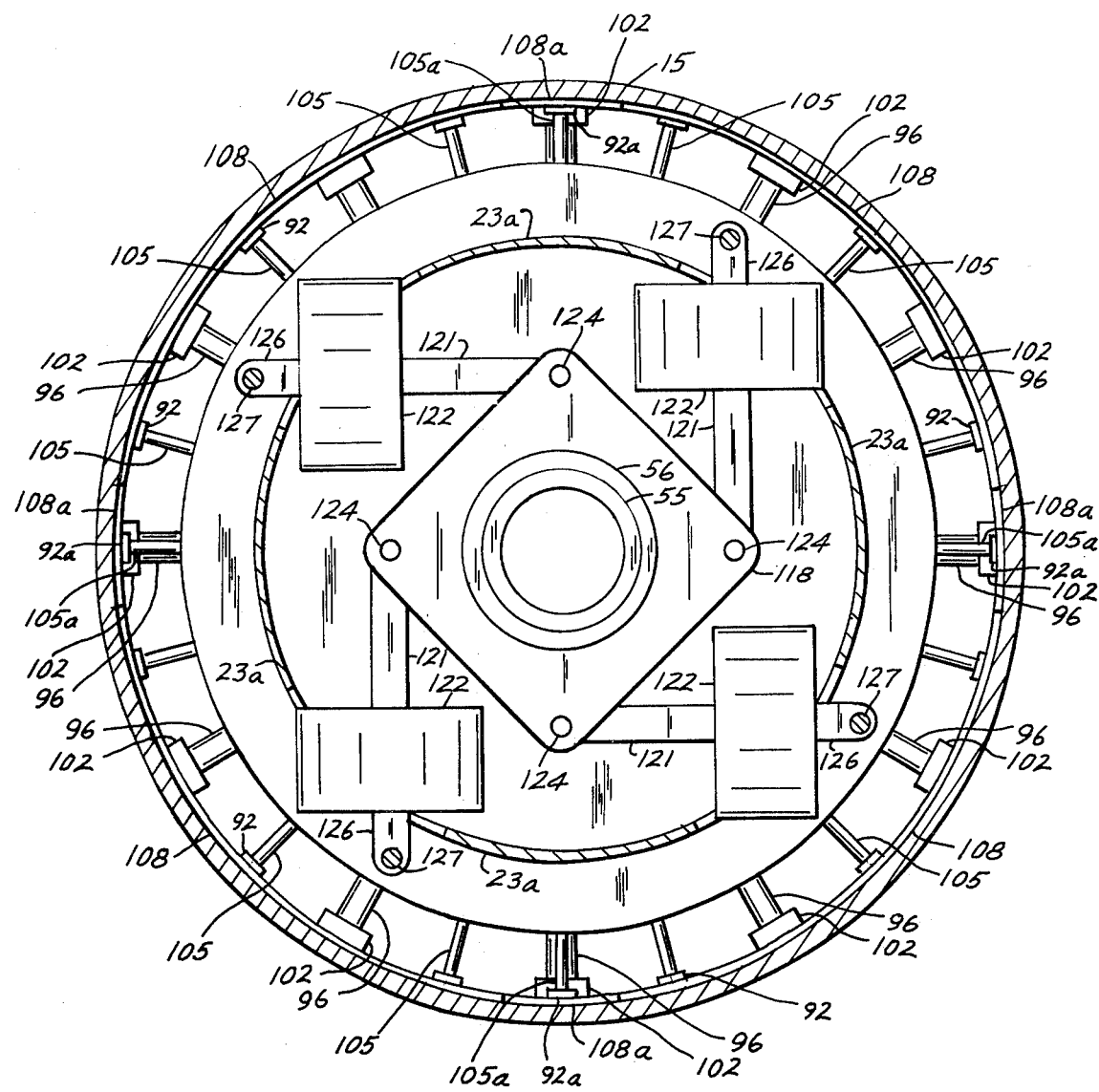
FIG. 3 is a transverse cross section taken at line 3—3 of FIG. 1.

Referring now to the drawings in detail, and first to FIGS. 1 and 3, abutted end to end pipe lengths or sections 14 and 15 are shown, within which the apparatus is disposed. The pipe ends are beveled at 16, 17, respectively, as shown. The apparatus is shown in a set or expanded condition within the abutted pipe ends.

A circular plate 20 forms one end of the apparatus, and a circular plate 22 forms the other end. Shroud plates 23 of cylindrical form are welded to plates 21, 22 and 31, 32 at 24, 25, respectively. Circular plates 31, 32 are disposed concentrically with plates 21, 22, and are spaced apart as shown. Plate 31 is recessed at its inner side around its peripheral portion at 35, and plate 32 is recessed at its inner side around its peripheral portion at 36. A circular ring 37 is fitted within the peripheral recesses 35, 36. A short cylindrical sleeve 38 is welded around a central opening 39 of plate 31, and a short cylindrical sleeve 40 is welded around a central opening 41 of plate 32. The welds are shown respectively at 42, 43. A ring shaped plate 45 is welded to the inner end of sleeve 38, the weld being shown at 46. A ring shaped plate 48 is welded by weld 49 to the inner end of sleeve 40. Sleeve 51 has a sleeve 52 closely surrounding an end portion thereof and welded thereto by welds, not shown. A sleeve shaped bearing 53 is disposed between sleeve 51 and sleeve 38 and ring shaped plate 45, as shown. Sleeves 51, 52, therefore, may rotate within sleeve 38 and plate 45. A sleeve 55 has a sleeve 56 closely surrounding an outer end portion, sleeve 56 being welded to sleeve 55 by welds, not shown. A sleeve shaped bearing 58 is disposed between sleeve 55 and sleeve 40 and end plate 48. Sleeve 55 extends to within sleeve 51 and is recessed at 60, a sleeve bearing 61 being disposed within recess 60 to bear outwardly against the interior of sleeve 51. Sleeve 55, therefore, may rotate with respect to sleeve 51.

A circular disc 65 has a central circular opening 66 which is fitted around sleeve 51 and fixed thereto by welding, the weld not being shown. Circular disc 68 having central circular opening 69 is fitted around sleeve 55 and welded thereto, the weld not being shown. Circular disc 65 rotates with sleeve 51, and circular disc 68 rotates with sleeve 55.

A circular disc 71 having a circular opening 72 through its center is rotatably engaged around the end of sleeve 51, adjacent circular disc 65. Disc 71 has circular ring spacer plates 74, 75 disposed in respective recesses 76, 77.

Disc 65 has a groove or slot 65a therearound in which are pivotally affixed the inner ends of toggles or links 81. Similarly, disc 68 has circular groove or slot 68a therearound in which are pivotally affixed the inner ends of toggles or links 82. Disc 71 has groove or slot 71a therearound in which are pivotally fixed the inner ends of toggles or links 83a. The inner ends of additional toggles 83, not shown in FIG. 1, are also pivotally fixed in slot 71a. The pivotal connections of the inner ends of toggles 83 in slot 71a are located farther inward in slot 71a than are the pivotal connections of toggles 83a.

Each toggle 81 is pivotally connected to disc 65 within slot 65a by a pivot pin 85 which extends into an opening in disc 65 at each side of the slot 65a. Each toggle 82 is similarly pivotally affixed to disc 68 by a pivot pin 88 which extends into openings in disc 68 at each side of slot 68a. The outer end of each toggle 81 is pivotally affixed by a pin 98 in a slot 91 in the inner end of a slide element 92 which is slidably disposed through a cylindrical opening 93 disposed radially through ring 37. Similarly, each toggle 82 is pivotally affixed at its outer end by a pin 99 in a slot 95 in the inner end of a slide element 96 which is slidably disposed through a cylindrical opening 97 disposed radially through ring 37.

A plurality of the slide elements 92, 96 are radially disposed and circularly spaced around ring 37. In FIG. 3 it is shown that there are twelve each of the slide elements 92, 96 equally circularly spaced around the apparatus in separate sets. Any suitable number of the slide elements may be used in each set. A sufficient number of the slide elements 92, 96 must be used such that the pipe ends will be adequately supported in circular forms when the clamps are engaged. Each slide element 92 or 96 has affixed to its outer end a block 102 having a resilient pipe engaging element 103 at its outer surface. These are of conventional design and their exact structures need not be described. They are affixed to the outer ends of the slide elements 92, 96 which are in the form of cylindrical rods, by bolts (not shown) in conventional fashion.

Each of the toggles 83, 83a is pivotally affixed at its inner end into slot 71a by a cross pin 104, 104a and is pivotally affixed at its outer end into a slot 107 of a slide element 105, 105a by a cross pin 106, 106a the cross pins extending into openings in slide element 105, 105a at each side of the slots. Each of the slide elements 105, 105a is disposed through a radial cylindrical opening through the ring 37 in the same manner as the slide elements 92 and 96. Each slide element 105, 105a is in the form of a cylindrical rod and has affixed at its outer end a metal pad 107 to which is affixed an arcuate band 108, 108a forming part of the welding back up assembly. The bands 108, 108a are preferably made of copper. Use of copper for the bands 108 causes rapid conduction of heat from the point at which welding is being done so that the weld is chilled somewhat to prevent penetration at the interior of the weld.

Referring to FIG. 3 of the drawings, four of the longer arcuate bands 108 are provided around the periphery of the pipe. In addition, four shorter bands 108a are provided which are interposed between the ends of the bands 108. Any convenient number of bands 108 and 108a may be provided, but preferably four of each of these bands are provided as shown in FIG. 3.

Figure 2:
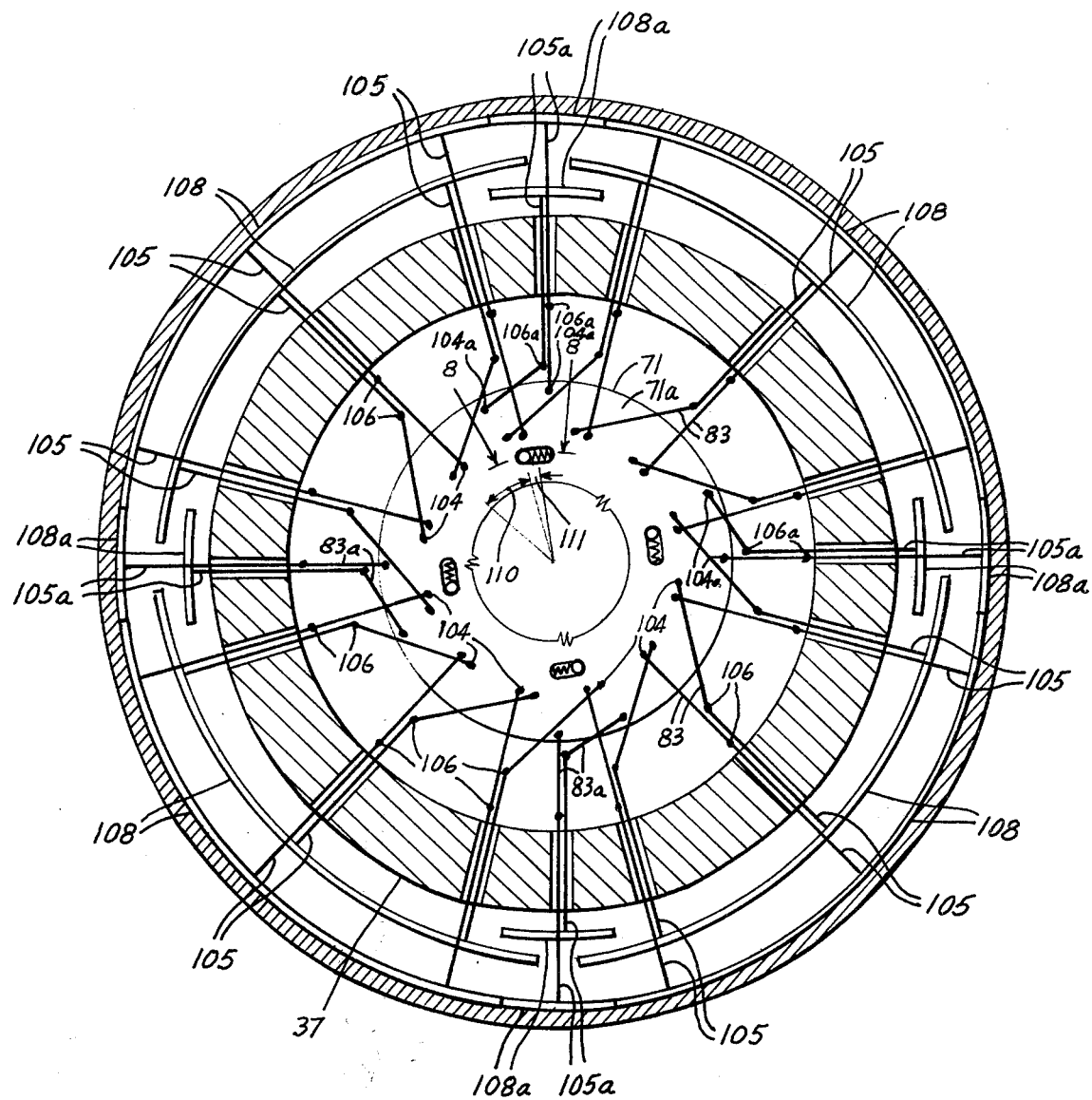
FIG. 2 is a schematic transverse cross section illustrating operation of the apparatus.

It will be noted from FIG. 1 that the slots 71a are deep slots, with the pins 104a being disposed at the outer part of the slot. Pins 104 are disposed at the inner part of the slot. Referring now also to FIG. 2 of the drawings, the slide elements 105, 105a are shown by single line representations, as are the toggle elements 83, 83a. Three slide elements 105 and toggle elements 83 are provided for each band segment 108. One slide element 105a and toggle element 83a is provided for each band segment 108a. When disc 71 is rotated counterclockwise, as shown in FIG. 2, the inner ends of the toggles 83, 83a are moved counterclockwise thereby drawing the slide elements 105, 105a inwardly. This causes retraction of the bands 108, 108a. The inner ends of toggles 83a are affixed at the outer portions of the slot 71 so that they move arcuately by a greater distance than do the inner ends of the toggles 83. The bands 108a, therefore, move inwardly faster and to a greater distance than the bands 108. This differential movement permits the ends of adjacent bands 108 to move to the more closely spaced positions necessary for retraction. When disc 71 is moved clockwise, the slide elements 105 and toggles 83 move the bands 108 outwardly to against the pipe, and the slide elements 105a and toggles 83a move the bands 108a to the periphery of the pipe after the bands 108 have seated thereagainst. When the bands reach the pipe surface, the bands 108 and 108a are positioned alternately as shown in FIG. 2. The movement of toggles 83 is shown at angle 110, the inner ends of toggles 83a moving the additional distance represented by angle 111.

Still referring to FIGS. 1 and 3 of the drawings, sleeve 52 has disposed therearound a pair of axially spaced plates 115, 116 and sleeve 56 has disposed therearound a pair of axially spaced plates 117, 118.

Only plate 118 is shown in FIG. 3 and plates 115–117 are of the same outward form. The central openings in the plates 115, 116 are larger than the central openings in plates 117, 118 since sleeves 51 and 52 are larger than are sleeves 55 and 56. Plates 115-118 are, as shown, of generally square shape each having a pivot opening 120 adjacent each corner. Shafts 121 of cylinders 122 are connected between plates 115, 116 and between plates 117, 118 by pivot pins 124. At its side opposite the shaft 121, each cylinder 122 has a pair of brackets 126 each engaged around a shaft 127 which is affixed between plates 21 and 31 or between plates 22 and 32 as shown in FIG. 1. Expansion of the cylinders 122 at the left side of FIG. 1, the shafts 121 of which are connected to plates 115, 116, causes rotation of shafts 51, 52 in one direction. Retraction of these cylinders causes rotation of shafts 51, 52 in the opposite direction. Operation of the cylinders 122 connected to plates 117, 118, at the right side of FIG. 1, similarly may cause rotation in both directions of shafts 55, 56. The cylinders 122 are provided with suitable hydraulic or pneumatic fluid connection lines from a suitable supply, these latter elements being conventional and not being shown in the drawings. The cylindrical plates 23, 23a have suitable openings 23b, 23c, respectively, to provide clearance with the cylinders 122.

Referring now to FIGS. 4 and 5 of the drawings, in order that the slide elements 92 (and 96) may exert maximum force against the pipe wall through shoes 102 and engagement elements 103, the slots 91 (and 95) and 65a (and 68a) are provided with engagement elements 131 and engagement ring 132, respectively. The engagement pads 131 are disposed in recesses 134 at the inner ends of the slots 91 (and 95), and the engagement ring 132 is disposed at the bottom of the slot 65a (and slot 68a). Only the elements of the lefthand engagement assembly in FIG. 1 are shown in FIGS. 4 and 5, those of the righthand engagement assembly being identical.

The opening through the inner end of each toggle 81 through which pin 85 is disposed is indicated by reference numeral 85a. Openings or holes 85b at opposite sides of slot 65a are non-circular, being elongated longitudinally of the toggle as best shown at 85c, 85d in FIG. 5. Pins 98 extend through holes 98a of the toggles. Openings 98b at opposite sides of slots 91 into which pins 98 are disposed are elongated longitudinally of the toggle at 98c, 98d. When endwise load is placed on the toggle 81, the toggle may move to engage at its end 81a against engagement pad 131, and its lower end 81b engages against engagement ring 132. Pad 131 has an arcuate recess 131a which matches the curve of end 81a of toggle 81. Likewise, the ring 132 has an arcuate recess 132 which matches end 81b of toggle 81. The clearances shown around pins 85, 98 in holes 85a, 98a in FIG. 5 do not exist, the pins being tightly fitted in these holes to reinforce the toggles against longitudinal loads. The clearances are shown in FIG. 5 only to show clearly the shapes of the pins and holes. This assembly provides that the endwise load on the toggle is not imposed on the pins 98, 85, but instead is imposed through metal to metal engagements between toggle end 81a and surface 131a, and between toggle end 81b and surface 132a. This structure avoids equipment failures resulting from overloading of the pins 98, 85 with consequent distortion or shear thereof, and makes the equipment much more capable of handling the loading forces required for its efficient operation. This structure also provides for compensation for wear of the equipment parts. Wear between surfaces 81a and 131a does not reduce the capacity of the apparatus, and similarly wear between surfaces 81b and 132a does not reduce the capacity or function of the apparatus. The ends of the toggles may wear quite severely without destroying the apparatus from a condition of use. As is well known in the art, any shortening of the toggles may be compensated for by shims provided between elements 102, 92, these being often used in the art to accommodate for variations in pipe dimensions.

Plate 22 is connected to a drive unit 141 which may be of conventional design. The drive unit 141 will have wheels for support of the apparatus within the pipe 15, one or more of such wheels being drive wheels to propel the apparatus through a pipe. At its opposite end, at plate 21, the apparatus will be affixed to a device 142 of conventional design, which will include wheels for support of the apparatus for rolling movement through a pipe, and which will usually include guiding means in the form of a streamlined bar assembly, frequently referred to as a "nose cone", to facilitate engagement of the pipe 14 over the end of the apparatus.

In operation of the apparatus, the apparatus is disposed in a pipe 15, which may be a single length of pipe or which may be the end of a series of lengths of pipe welded together into a pipeline, the apparatus being supported by the wheels of devices 141, 142 and propelled through the pipe to proper position by the drive wheel or wheels of apparatus 141. The apparatus is supported at its lefthand portion, which is moved to protrude past the end of pipe 15, by a crane or other device suitable for adjustment of the position of the apparatus. The shoes 102 at the ends of slide elements 96 are positioned properly spaced from the end of pipe 15. Then, the cylinders 122 at the righthand side of FIG. 1 are operated to rotate plates 117, 118 and sleeves 55, 56. This operation causes rotation of disc 68 to which toggles 82 and slide elements 96 are connected. During movement of the apparatus into pipe 15 and positioning thereof at the end of pipe 15, the toggles 82 will be disposed angular to slide elements 96, and the latter will be retracted. During setting of the clamp, the rotation of sleeve 55 and the connected elements will be in a direction to move the pins 88 to positions radially inward of the associated pins 99 so that toggles 82 will be in line or nearly in line with slide elements 96. This movement expands the shoes 102 against the pipe wall and clamps the apparatus in place within pipe 15. The clamping forces are very high so that the apparatus is firmly held within the end of pipe 15 with the lefthand portion of the apparatus, as shown in FIG. 1, protruding past the end of pipe 15. The shoes 102 must be as nearly as possible at uniform distances from the end of pipe 15 so that the apparatus is in line with pipe 15.

After this has been accomplished, another pipe 14, which will usually be a single length of pipe or a double jointed or triple jointed length of pipe, is run in over the lefthand part of the apparatus, the shoes 102 thereof being at this time in retracted position. The pipe 14 is handled for movement over the apparatus to abutment with the end of pipe 15 by pipe supporting slings or rollers which are known in the art. The end of pipe 14 will usually be spaced from the end of pipe 15 uniformly therearound by a small space 151 of the order of one sixteenth inch, more or less. With pipe 14 properly aligned with pipe 15, the cylinders 122 at the lefthand side of FIG. 1 are operated to rotate disc 65 to move slide elements 92 from their retracted to their expanded conditions in clamped engagements within the end of pipe 14.

It will be recalled that disc 65 is affixed to sleeve 51, while disc 71 is rotatable with respect to sleeve 51. As the lefthand cylinders 122 are operated to rotate the expansion-retraction elements, disc 65 is rotated, disc 71 being rotated therewith by force imposed through springs 152 (see FIGS. 2 and 8) until bands 108 and 108a engage the interiors surfaces of the pipe ends at the abutment therebetween. Slide elements 92 may thereafter continue to be expanded to more firmly engage the shoes 102 with pipe 14, but excess pressuring of strips or bands 108, against the pipes does not occur because pins 153 fixed to disc 65 move along slots 154 compressing springs 152 until adequate clamping of shoes 102 has been accomplished, but without further movement of disc 71 to more firmly force bands 108, 108a against the pipes. This provision permits adequately firm clamping of the shoes 102 within pipe 14 but without overforcing the bands 108, 108a against the pipes and possibly causing damage thereto.

Also, this provision permits a certain amount of nonuniformity between the expansions of slide elements 92 and 105, 105a, thereby freeing up the manufacturing tolerances somewhat. In other words, the shoes 102 do not have to meet the pipe wall at the same instant that the bands 108, 108a meet the pipe walls.

The bands 108, 108a engage firmly around the pipe ends and overlap space or gap 151, and provide a completely satisfactory back up for formation of a weld between surfaces 16, 17. While there may be very small spacings between adjacent elements 108, 108a, these will be of such small magnitude that interruption of the weld does not occur.

Figure 6:
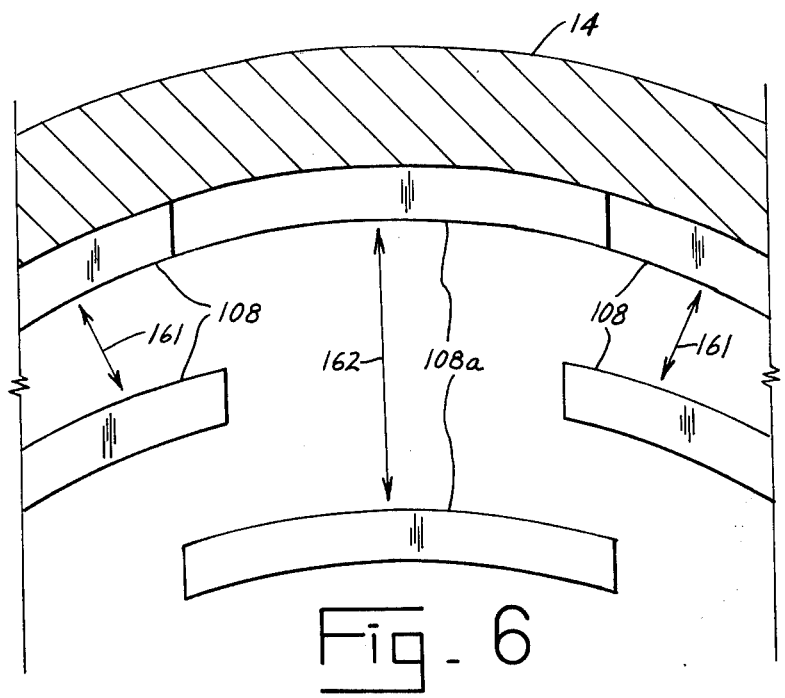
FIGS. 6 and 7 are schematic drawings showing operation of the welding back up assembly and illustrating two modifications thereof.
Figure 7:
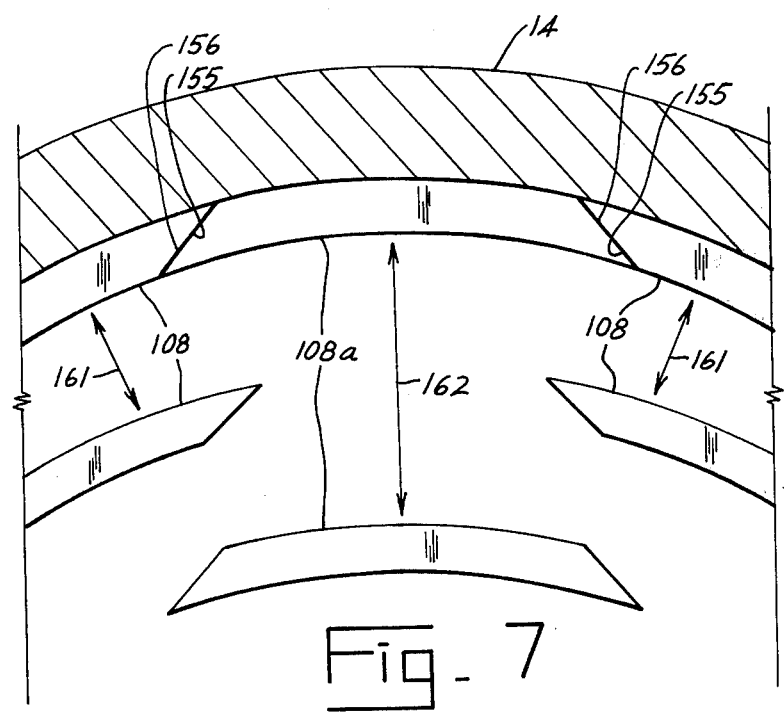

Referring now to FIGS. 6 and 7 of the drawings, the movements of elements 108, 108a are indicated by arrows 161, 162, respectively. The supports for the elements 108, 108a are not shown in FIGS. 6 and 7 in order to simplify the drawings. FIGS. 6 and 7 also show modifications of the ends of the elements 108, 108a which may be utilized. In FIG. 6, the adjacent ends of elements 108, 108a are parallel to the direction of movement of the elements 108a. This is an improvement over the directions of the abutments in radial directions as shown in FIG. 1, and permits somewhat closer spacing between the adjacent elements. In FIG. 7, the ends 155 are beveled at inwardly facing angles as shown, while the ends 156 of elements 108a are beveled at outwardly facing surfaces of the same taper. Since the elements 108a seat against the pipe slightly after the elements 108 seat against the pipe, this angular configuration of the band ends not only prevents the possibility of elements 108 hanging up at one or both ends but also provides for even smaller spacing between the adjacent elements and minimizes the circumferential gaps therebetween. This configuration also provides that the elements 108a may unseat from the pipe surfaces ahead of the unseating of the elements 108 upon retraction of the band elements.

The apparatus herein disclosed and claimed is very satisfactory in operation and permits improved welds while not complicating operation of the apparatus. The proper disposition of the bands 108, 108a is automatic upon setting of the second set of clamps in the free pipe length end, so that the operator need not follow special procedures for insertion and proper placement of a welding back up at the pipe end abutment. The apparatus is relatively simple as compared with other apparatuses known in the art and is economical in manufacture.

While preferred embodiments of the apparatus according to the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Welding clamp apparatus, comprising first and second axially spaced clamp assemblies each comprising plural circularly spaced clamps, each said clamp comprising a radially disposed element radially movable by toggle means having its outer end pivotally connected to said radially disposed element and having its inner end pivotally connected to one of first and second hub means each adapted to be driven in rotation about said axis, separate means for driving each said hub means in rotation about said axis in either direction to separately expand or retract each said clamp assembly.

2. The combination of claim 1, each said means for driving one of said hub means in rotation comprising fluid cylinder means.

3. The combination of claim 2, each said hub comprising sleeve means having disc means fixed therearound to which said inner toggle means ends are pivotally affixed, the sleeve means of said first and second hub means being mutually telescopically engaged yet being separately rotatable.

4. The combination of claim 3, including additional disc means rotatably disposed about said sleeve means of said first hub means between said disc means of said first and second hub means, additional toggle means having their inner ends pivotally connected to said additional disc means and their outer ends pivotally connected to radially slidable elements having segmented arcuate strip means carried at their outer ends, said strip means when fully expanded against the pipe ends by rotation of said additional disc means in said one direction together forming a continuous welding back up about the abutment between pipe ends clamped for welding by said first and second clamp assemblies.

5. The combination of claim 4, the toggle elements connected to the slide elements of alternate ones of said strip means being connected to said additional disc means outwardly of the connections of the others of said toggle means to said additional disc means, whereby upon rotation of said additional disc means in either direction said alternate ones of said strip means are moved radially farther than the others of said strip means, whereby upon retractions of said strip means mechanical interference between adjacent ones of said strip means does not occur.

6. The combination of claim 5, said additional disc means being connected to said first hub means by resilient means whereby said first hub means may continue to rotate in said one direction to expand said first clamp assembly after said arcuate strip means have been fully expanded.

7. The combination of claim 6, said additional disc means being disposed between said disc means of said first and second hub means, said resilient means connecting said additional disc means to said first hub means comprising pin means depending from one of said disc means of said first hub means and said additional disc means and compression spring means engaging one of said additional disc means and said disc means of said first hub means.

8. The combination of claim 7, said toggle means pivotal connections at at least one end of each said toggle means being connected by a cross pin connection having play in the toggle means direction whereby the clamping load is borne by metal to metal engagement of the toggle means with the element to which the toggle means is pivotally connected and whereby excessive load is not imposed on said cross pins.

9. Internal pipe clamp apparatus for use in holding pipes together end to end for welding, comprising first and second axially spaced sets of clamps, each said set of clamps comprising a plurality of clamp elements disposed circularly spaced about the axis of a pair of pipes disposed end to end within which the apparatus is disposed, separate rotatable means each disposed concentrically about said axis for separately expanding and retracting each said set of clamps into and out of clamping engagement within the end of one of said pipes; each said clamp element comprising a radially disposed radially reciprocably movable slide element having a pipe engagement shoe at its outer end, and a toggle element pivotally connected at its ends between the inner end of said slide element and one of said rotatable means; each said rotatable means including means for rotating the rotatable means in one direction to move said toggle elements toward radial positions to expand said clamp elements into engagement with one of said pipes and for rotating the rotatable means in the other direction to move said toggle elements away from radial positions to retract said clamp elements away from engagement with the pipe.

10. The combination of claim 9, including means for supporting said apparatus within said pipes and for moving said apparatus through said pipes.

11. The combination of claim 9, including ring means spaced around each said rotatable means and having radial passages through which said slide elements are slidably disposed.

12. The combination of claim 9, said means for rotating comprising fluid cylinder means for driving each said rotatable means in rotation in both directions.

13. The combination of claim 12, each said rotatable means comprising tubular sleeve means.

14. The combination of claim 13, each said fluid cylinder means being connected to one of said rotatable means by crank means extending outwardly from the rotatable means.

15. The combination of claim 14, each said fluid cylinder means comprising a plurality of fluid cylinders.

16. The combination of claim 9, including means expandable to interiorly bridge the abutment between said pipes and retractable therefrom to provide an interior back up for a weld formed from the exterior of said pipes.

17. The combination of claim 16, said means expandable to interiorly bridge said abutment comprising arcuate strip means disposed end to end about the interior of said pipe end abutment, alternate ones of said strip means being retracted to a greater extent than the others of said strip means, whereby mechanical interference between adjacent strip means upon retraction thereof is eliminated.

18. The combination of claim 17, each said strip means being carried at the outer end of radially disposed radially reciprocably movable slide means, and means for simultaneously moving said slide means outwardly and inwardly to respectively expand and retract said strip means.

19. The combination of claim 18, each said slide means being pivotally connected at its inner end to the outer end of a toggle link, the inner end of each said toggle link being pivotally connected to a rotatable member, said inner ends of said toggle links connected to slide means of said alternate strip means being connected to said rotatable member at a larger radius thereof than the other toggle means, whereby upon rotation of said rotatable member said alternate strip means are moved farther radially than said other strip means as described.

20. The combination of claim 19, including a ring member disposed around said rotatable member having radial passages therethrough through which said slide means are slidably disposed.

21. The combination of claim 19, including means for guiding said slide elements and means for guiding said slide means in said reciprocating movements thereof.

22. The combination of claim 21, each said guiding means comprising plural radially disposed passage means through which said slide elements and said slide means are disposed.

23. The combination of claim 22, including means for supporting said apparatus within said pipes and for moving said apparatus through said pipes.

24. The combination of claim 22, said means for rotating comprising fluid cylinder means for driving each said rotatable means in rotation in both directions.

25. The combination of claim 24, each said rotatable means comprising tubular sleeve means.

26. The combination of claim 25, each said fluid cylinder means being connected to one of said rotatable means by crank means extending outwardly from the rotatable means.

27. The combination of claim 26, each said fluid cylinder means comprising a plurality of fluid cylinders.

28. The combination of claim 19, said rotatable member having connection to one of said rotatable means for rotation therewith, said connection being resilient whereby the rotatable means may continue to rotate to continue expansion of one of said sets of clamps after said strip means have fully seated against the pipe end abutment, whereby said one of said sets of clamps may be firmly clamped within the pipe end within which it is disposed.

29. The combination of claim 9, including means for guiding said slide elements in said reciprocal movements thereof.

30. The combination of claim 29, said guiding means comprising ring means having radial passages through which said slide elements are slidably disposed.

31. The combination of claim 9, said toggle element pivotal connections at at least one end of each said toggle element being connected by a cross pin connection having play in the toggle element direction whereby the clamping load is borne by metal to metal engagement of the toggle element with the element to which the toggle element is pivotally connected and whereby excessive load is not imposed on said cross pins.

32. Welding back up assembly for disposition interiorly of the abutment between two pipes disposed end to end for welding, comprising a plurality of first arcuate strips disposed circularly spaced about said abutment, the same plurality of second arcuate strips disposed circularly spaced about said abutment and adapted to substantially fill said spaces between said first arcuate strips whereby said first and second arcuate strips together form a substantially continuous welding back up strip around said abutment, said first arcuate strips being radially movable between first positions clamped against said abutment and second positions spaced radially inward of said abutment, said second arcuate strips also being radially movable between first positions clamped against said abutment and second positions spaced radially inward of said abutment and spaced inwardly of said first arcuate strips, means for moving said first arcuate strips between their said first and second positions, means for moving said second arcuate strips between their said first and second positions, said second positions of said second arcuate strips being spaced radially inward of said second positions of said first arcuate strips, said first and second arcuate strips being spaced by open spaces therebetween when disposed away from their respective said first positions toward their respective said second positions whereby mechanical interference between said first and second arcuate strips does not occur when said first and second arcuate strips are moved between their respective said first positions and their respective said second positions, said means for moving said first arcuate strips comprising first radially slidable elements carrying said first arcuate strips at their outer ends and pivotally connected to the outer ends of first toggle elements at their inner ends, said first toggle elements being pivotally connected at their inner ends to central rotatable means which when rotated in one direction cause outward movements of said first arcuate strips toward their said first positions and which when rotated in the opposite direction cause inward movements of said first arcuate strips toward their said second positions, said means for moving said second arcuate strips comprising second radially slidable elements carrying said second arcuate strips at their outer ends and pivotally connected to the outer ends of second toggle elements at their inner ends, said second toggle elements being pivotally connected at their inner ends to central rotatable means which when rotated in said one direction cause outward movements of said second arcuate strips toward their said first positions and which when rotated in said opposite direction cause inward movements of said second arcuate strips toward their said second positions, said second toggle element pivotal connections to said central rotatable means being outward of said first toggle element pivotal connections thereto, whereby said second arcuate strips are moved farther radially than are said first arcuate strips upon rotation of said central rotatable means in either direction.

33. The combination of claim 32, said first and second radially slidable elements being of the same radial length, and said first toggle elements being longer than said second toggle elements by the distance that said second toggle element pivotal connections to said central rotatable means are outward of said first toggle element pivotal connections to said central rotatable means.

34. The combination of claim 33, said central rotatable means being connected for rotation thereby to one rotary clamp setting element of a welding clamp having two sets of clamps one disposed at each side of said welding back up assembly and each adapted to clamp within the end of one of said abutted pipes.

35. The combination of claim 34, said connection of said central rotatable means to said one rotary clamp setting element including a spring biased override whereby said one rotary clamp setting element may rotate farther than said central rotatable means.

* * * * *